Patented July 6, 1954

2,683,149

UNITED STATES PATENT OFFICE 2,683,149

PROCESS FOR THE PRODUCTION OF
4-HYDROXYCOUMARINS

Arthur W. Weston, Waukegan, and William B. Brownell, Warren, Ill., assignors to Abbott Laboratories, North Chicago, Ill., a corporation of Illinois No Drawing. Application January 24, 1951,
Serial No. 207,648

4 Claims. (Cl. 260—343.2)

Our invention relates to an improved process for the preparation of coumarin compounds, and in particular 4-hydroxycoumarin, utilizing the reaction of a carbonic ester with an ortho-hydroxy-lower-alkylphenylketone.

There is disclosed in United States Patent 2,449,162 to Dickenson a process for preparing a coumarin compound utilizing an ortho-hydroxy-lower-alkylphenylketone and a carbonic ester. The patentee uses as a condensing agent an alkali-metal alcoholate. As a result of a research investigation, we have discovered that we can produce the desired coumarin compound, and particularly 4-hydroxycoumarin, in surprisingly high yield using an alkali-metal hydride as the condensing agent. The increase in yield and the other advantages accruing from the use of an alkali-metal hydride are unobtainable when the condensing agent of the prior art is employed. The other advantages accruing from the use of our process will be hereinafter apparent.

We have also discovered that an important phase of our invention involves the use of a hydrocarbon solvent having a boiling point in excess of 100° C. in conjunction with the alkali-metal hydride condensing agent. We have found the differential in yield using an alkali-metal hydride in conjunction with a hydrocarbon solvent to our surprise is approximately twice that when an alkali-metal alcoholate is used.

We have discovered that the advantages from the use of an alkali-metal hydride condensing agent are many, and those referred to are but a few of those available to the user of our process. When an alkali-metal hydride is used, one of the unique improvements resulting is that the products obtained are purer. This results in many economies, since the coumarins otherwise require extensive purification for use in the preparation of further derivatives. When alkali-metal hydrides are used, melting points of the desired compounds are found to be sharper in character and also higher. When the reaction products are subjected to recrystallization, there is a substantially smaller loss of yield using alkali-metal hydrides than with alkali-metal alcoholates. Associated with the loss of material in the more impure alkali-metal alcoholate reaction-product are increased labor and equipment costs. The product resulting from the use of an alkali-metal hydride is almost always white in color and when an occasional batch shows coloration, it is of a very slight degree. When using alkali-metal alcoholates, the reaction products were found to be highly colored in almost every batch.

Alkali-metal hydrides when used according to our process remove many of the hazards incumbent in the preparation of alkali-metal alcoholates. The alkali-metal hydrides as used in our process are less likely to cause fire upon handling, and are less likely to be dissipated by the moisture and other constituents of the air than are the alkali-metal alcoholates; which require the use of elemental sodium.

We have found the differential in yields using an alkali-metal hydride over the alkali-metal alcoholate with ortho-hydroxyacetophenone and diethylcarbonate to be of a high order. This is particularly true when a hydrocarbon solvent having a boiling point over 100° C. is used. For example, when using toluene as the solvent and sodium hydride as the condensing agent, yields in the range of 90% were constantly obtained. On the other hand, using toluene as the solvent with sodium ethylate, a yield in the range of 45% was the maximum that could be obtained. That is not the only advantage since the product, 4-hydroxycoumarin, obtained using sodium hydride was a white crystalline material having a melting point of 213–214° C. On the other hand, the 4-hydroxycoumarin obtained with the toluene and sodium ethylate showed considerable tan color and had a melting point of only 210 to 211° C. The sodium hydride product obtained from one crystallization was of sufficient purity to use in the preparation of 3-(1'-phenyl-2'-acetyl)-ethyl-4-hydroxycoumarin. On the other hand, the sodium ethylate product required considerable recrystallization and purification before it was suitable for use in the preparation of 3-(1'-phenyl-2'-acetyl)-ethyl-4-hydroxycoumarin. For the process of preparation of 2-(1'-phenyl-2'-acetyl)-ethyl-4-hydroxycoumarin see United States Patent No. 2,427,578 of Stahmann et al.

The use of the hydrocarbon solvent, such as toluene, provides an additional advantage over that of high yields. By using the hydrocarbon solvent, it is not necessary to use an excess of the rather expensive di-lower alkyl carbonates. We contemplate in our invention the use of any hydrocarbon solvent having a boiling point in excess of 100° C. We have discovered toluene to be the preferred solvent according to our process, although solvents such as xylene, mesitylene and alkanes such as n-octane, n-decane are satisfactory.

We contemplate the use of any alkali-metal hydride for our process and particularly sodium hydride, potassium hydride and lithium hydride. However, sodium hydride is preferred. We prefer sodium hydride in finely divided form. It is preferably handled as a powder moistened with the hydrocarbon solvent. Under these conditions it may be readily handled without the danger of spontaneous explosions incumbent with use of sodium in preparing sodium alcoholates.

In condensing the ortho-hydroxy-lower-alkyl-phenylketones according to our process, a carbonate having the formula $CO.(OR)_2$, in which R is selected from alkyl and aralkyl is contemplated. We prefer the use of di-lower alkyl carbonates such as dimethylcarbonate, diethylcarbonate, dibutylcarbonate, etc. However, we particularly prefer the use of diethylcarbonate.

We contemplate as the lower-alkylphenylketone which may be used, those having a hydroxy group in the ortho position to a lower alkylketone group. We contemplate such ortho-hydroxy-lower-alkyl-phenylketones as ortho-hydroxy-acetophenone, ortho-hydroxy-propio- or ortho-hydroxy-butyrophenone. These alkylphenylketones might also be described as ortho-hydroxy-methylphenylketone, ortho-hydroxy-ethylphenylketone or ortho-hydroxy-propylphenylketone. We define these as ortho - hydroxy - lower - alkylphenylketones. Other substituents such as alkyl groups may be attached to the benzene ring and are satisfactory for our process so long as they do not interfere with the condensation reaction.

In general, our process may be stated to involve the addition of the di-lower-alkyl-carbonate and the ortho-hydroxy-lower-alkylphenylketone to a stirred suspension of alkali-metal hydride in either the hydrocarbon solvent alone, excess dialkylcarbonate or mixture of hydrocarbon solvent and dialkylcarbonate. The alcohol formed from the reaction of the dialkyl carbonate and sodium hydride is removed by distillation. The slurry which forms is cooled and the solids are dissolved in water. The aqueous layer is removed and acidified with an acid, preferably a mineral acid such as hydrochloric acid, and the precipitated solid removed by filtration.

In order more clearly to disclose the nature of the present invention, specific examples illustrating the preparation of typical compounds will hereinafter be described. It should be understood, however, that this is done solely by way of example and is intended neither to delineate the scope of the invention nor limit the ambit of the appended claims.

*Example I*

About 27.2 g. (0.2 mole) of ortho-hydroxy-acetophenone and 150 cc. of diethylcarbonate are added over a period of approximately 30 minutes to a stirred suspension of 9.6 g. (0.4 mole) of sodium hydride in 100 cc. of the diethylcarbonate. The reaction mixture is stirred in a heated oil bath having a temperature of 120° C. The alcohol formed by the reaction is removed as it forms through a distillation column. This is continued until all of the alcohol formed has been removed. The slurry is cooled and the solids which precipitate are dissolved in 250 cc. of water. The aqueous layer is separated and the organic layer is washed once with 50 cc. of water. The aqueous layer and the washings are combined, treated with adsorbent charcoal and filtered. The filtrate is acidified by hydrochloric acid which precipitates the coumarin which is then removed by filtration. The crude precipitate is dissolved in 100 cc. of hot ethyl alcohol (containing 5% methanol denaturant), and 100 cc. of water is added. After the mixture has stood and cooled, the precipitate is again removed by filtration. The yield of 4-hydroxycoumarin is 25 g. (77%) and the product has a melting point of 212–213° C. The color of the product is substantially white.

*Example II*

About 27.2 g. (0.2 mole) of ortho-hydroxy-acetophenone and 48 g. (0.4 mole) of diethylcarbonate are added over a period of one half hour to a stirred suspension of 9.6 g. (0.4 mole) of sodium hydride in 200 cc. of toluene heated on an oil bath at 120° C. The alcohol is removed continuously through a distillation column. The slurry is cooled and the solids which form are dissolved in 250 cc. water. The aqueous layer is separated and the toluene layer is washed once with a 150 cc. quantity of water. The 4-hydroxycoumarin is recovered and purified as in Example I. The yield is 29.2 g. (90%) and the product has a melting point of 213–214° C. The product is pure white.

Others may readily adapt the invention for use under various conditions of service, by employing one or more of the novel features disclosed, or equivalents thereof. As at present advised with respect to the apparent scope of our invention, we desire to claim the following subject matter.

We claim:

1. The process of producing a coumarin which comprises heating an ortho-hydroxy-lower-alkyl-phenylketone with a di-lower-alkyl carbonate in the presence of toluene and an alkali metal hydride, distilling off the alcohol formed in the reaction and treating the product with acid to liberate said coumarin.

2. The process according to claim 1 wherein the carbonate is diethylcarbonate.

3. The process according to claim 1 wherein the hydride is sodium hydride.

4. The process of producing 4-hydroxycoumarin which comprises heating ortho-hydroxy-acetophenone with diethylcarbonate at about 120° C. in the presence of sodium hydride and toluene distilling off the alcohol formed in the reaction, and precipitating the coumarin by the addition of mineral acid.

References Cited in the file of this patent

UNITED STATES PATENTS

| Number | Name | Date |
|---|---|---|
| 2,218,026 | Hansley | Oct. 15, 1940 |
| 2,449,162 | Dickenson | Sept. 14, 1948 |
| 2,465,293 | Stahmann et al. | Mar. 22, 1949 |
| 2,471,047 | Stahmann et al. | May 24, 1949 |